US011260909B2

(12) United States Patent
Sardes et al.

(10) Patent No.: US 11,260,909 B2
(45) Date of Patent: *Mar. 1, 2022

(54) VEHICLE CHASSIS PLATFORM

(71) Applicant: REE AUTOMOTIVE LTD, Tel Aviv (IL)

(72) Inventors: Ahishay Sardes, Tel Aviv (IL); Eran Starik, Tel Aviv-Jaffa (IL); Ran Dekel, Nofit (IL); Tomer Segev, Tel-Aviv (IL); Amit Aknin, Karkom (IL); Eylon Avigur, Ramat-Gan (IL); Amos Boaz, Moshav Shoresh (IL)

(73) Assignee: REE AUTOMOTIVE LTD, Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/166,457

(22) Filed: Feb. 3, 2021

(65) Prior Publication Data

US 2021/0197897 A1    Jul. 1, 2021

Related U.S. Application Data

(63) Continuation-in-part of application No. 16/943,692, filed on Jul. 30, 2020, now Pat. No. 10,919,575, and (Continued)

(51) Int. Cl.
*B62D 21/00* (2006.01)
*B62D 21/10* (2006.01)
(Continued)

(52) U.S. Cl.
CPC ............... *B62D 21/10* (2013.01); *B60K 1/04* (2013.01); *B62D 21/03* (2013.01); *B60K 2001/0416* (2013.01); *B60K 2001/0438* (2013.01)

(58) Field of Classification Search
CPC .......... B60L 50/66; B60L 53/80; B60L 1/003; B60L 1/02; B60L 50/64; B60L 50/52;
(Continued)

(56) References Cited

U.S. PATENT DOCUMENTS 6,059,058 A * 5/2000 Dower .................... B60L 50/66
180/65.22
6,880,856 B2    4/2005 Chernoff et al.
(Continued)

FOREIGN PATENT DOCUMENTS

GB         2565848       2/2019
WO    WO 2012/117204    9/2012

OTHER PUBLICATIONS

Chernoff, Adrian; The Skateboard Platform Impact—A 20 Year Journey; retrieved Aug. 3, 2020; htto://www.adrianchernoff.com/project/electic-skateboard-platform/.
(Continued)

*Primary Examiner* — Toan C To
(74) *Attorney, Agent, or Firm* — Pearl Cohen Zedek Latzer Baratz LLP

(57) ABSTRACT

A vehicle chassis platform including: a frame having a front frame end, a rear frame end, a longitudinal frame axis, an upper frame surface, a bottom frame surface, a first longitudinal lateral frame surface and a second longitudinal lateral frame surface, wherein the upper frame surface is substantially flat; and two or more mechanical connection assemblies each coupled to one of the first and second longitudinal lateral surfaces, each of mechanical connection assemblies to couple a vehicle corner module (VCM) to the frame and to transfer mechanical loads between the frame and the VCM when the VCM is coupled to the frame.

18 Claims, 12 Drawing Sheets

Related U.S. Application Data a continuation-in-part of application No. 35/509,750, filed on Jun. 3, 2020 (U.S. filing date under 35 U.S.C. 384), and having an international filing date of Jun. 3, 2020.

(51) Int. Cl.
  B60K 1/04 (2019.01)
  B62D 21/03 (2006.01)

(58) Field of Classification Search
  CPC .................. B60L 2270/40; B60K 1/04; B60K 2001/0472; B62D 63/025; B62D 65/005; Y02T 90/124; Y02T 90/12; Y02T 90/14; Y02T 10/70; Y02T 10/7072; Y02T 10/7005; Y02T 10/705
  See application file for complete search history.

(56) References Cited

U.S. PATENT DOCUMENTS

| | | | |
|---|---|---|---|
| 7,303,033 B2 * | 12/2007 | Chernoff | B62D 65/04 |
| | | | 180/65.8 |
| 7,441,615 B2 | 10/2008 | Barroni-Bird et al. | |
| 8,278,771 B2 | 10/2012 | Lai | |
| 10,266,206 B2 * | 4/2019 | Gallier | B62D 25/16 |
| 10,919,575 B1 * | 2/2021 | Sardes | B62D 25/08 |
| 2011/0095574 A1 | 4/2011 | Brown | |
| 2012/0121962 A1 * | 5/2012 | Katayama | H01M 10/625 |
| | | | 429/120 |
| 2012/0161472 A1 * | 6/2012 | Rawlinson | B60R 16/04 |
| | | | 296/187.08 |
| 2014/0315064 A1 * | 10/2014 | Katayama | B60L 58/27 |
| | | | 429/120 |
| 2015/0083508 A1 | 3/2015 | Bluethmann et al. | |
| 2018/0118265 A1 | 5/2018 | Gallier | |
| 2018/0345778 A1 * | 12/2018 | Yamanaka | B62D 21/02 |
| 2019/0193620 A1 | 6/2019 | Matsuoka et al. | |

OTHER PUBLICATIONS

Mercedes-Benz Vision Urbanetic Concept Skateboard Chassis; Dec. 2018; retrieved Aug. 12, 2020; https://www.carbodydesign.com/gallery/2018/12/mercedes-benz- vision-urbanetic-concept/24/.
International Search Report for PCT Appl. No. PCT/IL2021/050924 dated Nov. 11, 2021.

* cited by examiner

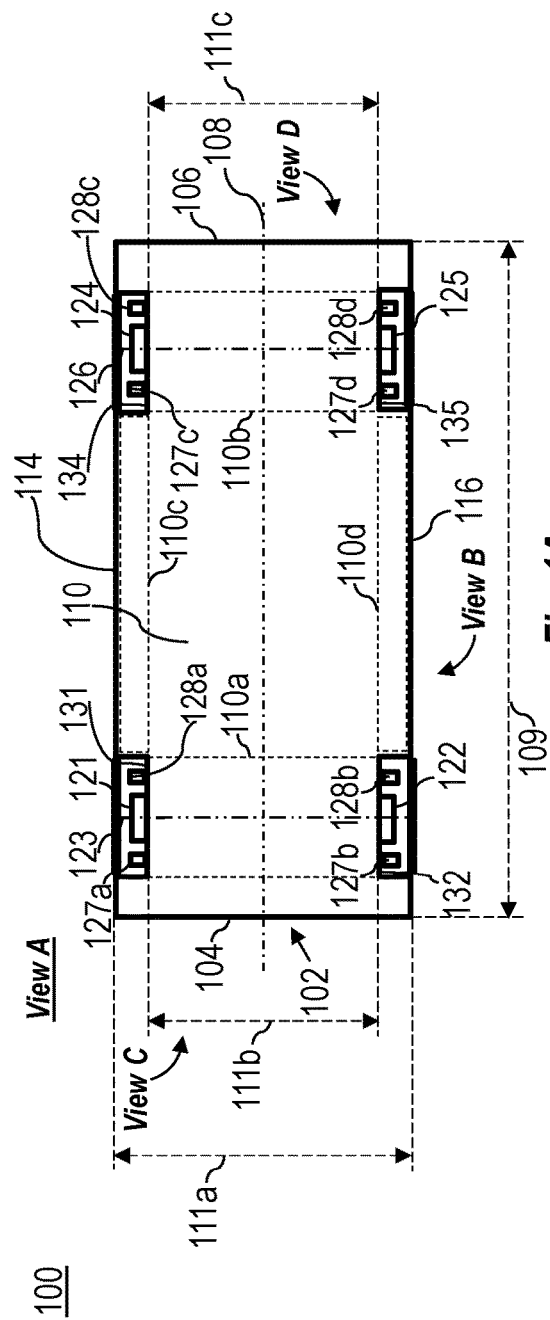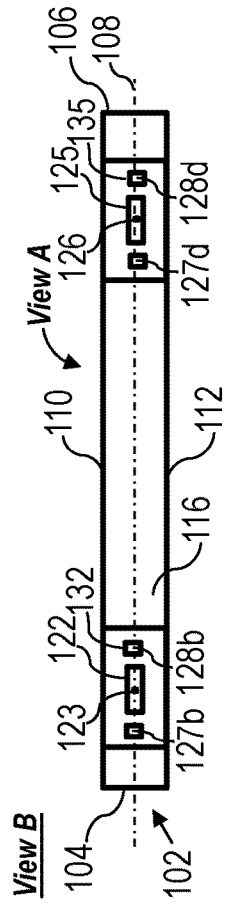

300

400

VEHICLE CHASSIS PLATFORM

CROSS REFERENCE TO RELATED APPLICATIONS

This application is a continuation-in-part of co-pending U.S. patent application Ser. No. 16/943,692, filed on Jul. 30, 2020, and granted as U.S. Pat. No. 10,919,575 on Feb. 16, 2021; this application is also a continuation-in-part of co-pending U.S. Design patent application No. 35/509,750 filed on Jun. 3, 2020, which claims priority to Israeli Design Application No. 64630 filed on Dec. 31, 2019, and granted as Israeli Design No. 64630 on Sep. 23, 2020, all of which incorporated herein by reference in their entirety and owned by the assignee of the instant application.

FIELD OF THE INVENTION

The present invention relates to the field of vehicle platforms, and more particularly, to vehicle chassis platforms.

BACKGROUND OF THE INVENTION

A vehicle chassis typically provides a load bearing framework for a motor vehicle or other wheeled conveyance. A vehicle chassis typically provides a framework for suspension, steering, drivetrain, and/or other systems of the vehicle. Components of these systems are typically positioned beneath a bottom surface of the vehicle chassis and can occupy a significant space beneath the bottom surface of the chassis and/or above the upper surface of the chassis. Such vehicle chassis typically has complex shape, relatively large footprint, and/or relatively high weight. Such vehicle chassis typically consists of non-continuous portions assembled to form the vehicle chassis. This may cause limited design flexibility of the vehicle chassis. For example, such vehicle chassis may have a limited number of locations that may accommodate electric-vehicle batteries (EVB) and/or limit the size of the EVB that may be used.

SUMMARY OF THE INVENTION

Some embodiments of the present invention may provide a vehicle chassis platform, including: a frame having a front frame end, a rear frame end, a longitudinal frame axis, an upper frame surface, a bottom frame surface, a first longitudinal lateral frame surface and a second longitudinal lateral frame surface, wherein the upper frame surface is substantially flat; and two or more mechanical connection assemblies each coupled to one of the first and second longitudinal lateral surfaces, each of mechanical connection assemblies to couple a vehicle corner module (VCM) to the frame and to transfer mechanical loads between the frame and the VCM when the VCM is coupled to the frame.

In some embodiments, the bottom frame surface is substantially flat and substantially parallel to the upper frame surface.

In some embodiments, a width of the upper frame surface is between 60% and 100% of a length of the upper frame surface.

In some embodiments, the upper frame surface includes at least one non-flat upper frame surface portion and a flat upper frame surface portion, and wherein an area of the flat upper frame surface portion is between 80% and 95% of a total area of the upper frame surface.

In some embodiments, the upper frame surface includes two non-flat upper frame surface portions disposed adjacent to opposite longitudinal lateral frame surfaces with respect to each other and along a transverse frame axis that is perpendicular to the longitudinal frame axis, and a width of the flat upper frame surface in an intermediate region between the two non-flat upper frame surface portions is between 40% and 90% of a maximal width of the upper frame surface.

In some embodiments, the flat upper frame surface portion extends between at least one of: the front frame end and the rear frame end; and the first longitudinal lateral frame surface and the second longitudinal lateral frame surface.

In some embodiments, the vehicle chassis platform includes at least one of: a pair of front mechanical connection assemblies including: a first front mechanical connection assembly coupled to the first longitudinal lateral frame surface, and a second front mechanical connection assembly coupled to the second longitudinal lateral frame surface, the first and second front mechanical connection assemblies are positioned along a front transverse frame axis that is perpendicular to the longitudinal frame axis; and a pair of rear mechanical connection assemblies including: a first rear mechanical connection assembly coupled to the first longitudinal lateral frame surface, and a second rear mechanical connection assembly coupled to the second longitudinal lateral frame surface, the first and second rear mechanical connection assemblies are positioned along a rear transverse frame axis that is perpendicular to the longitudinal frame axis.

In some embodiments, the frame includes at least one of: a pair of front VCM concave indents including: a first front VCM concave indent being part of the first longitudinal lateral frame surface, the first front VCM concave indent includes the first front mechanical connection assembly, and a second front VCM concave indent being part of the second longitudinal lateral frame surface, the second front VCM concave indent includes the second front mechanical connection assembly; and a pair of rear VCM concave indents including: a first rear VCM concave indent being part of the first longitudinal lateral frame surface, the first rear VCM concave indent includes the first rear mechanical connection assembly, and a second rear VCM concave indent being part of the second longitudinal lateral frame surface, the second rear VCM concave indent includes the second front mechanical connection assembly.

In some embodiments, a width of the upper frame surface in a region between at least one of: the first and second front VCM concave indents, and the first and second rear VCM concave indents, is between 40% and 90% of a maximal width of the upper frame surface.

In some embodiments, the frame includes one or more electrical-vehicle batteries compartments positioned between: the upper frame surface and the bottom frame surface, and between the front frame end and the front transverse frame axis.

In some embodiments, the frame includes one or more electrical-vehicle batteries compartments positioned between: the upper frame surface and the bottom frame surface, and between the rear frame end and the rear transverse frame axis.

In some embodiments, the frame includes one or more electrical-vehicle batteries compartments positioned between: the upper frame surface and the bottom frame surface, and between the first front mechanical connection assembly and the second front mechanical connection assembly.

In some embodiments, the frame includes one or more electrical-vehicle batteries compartments positioned between: the upper frame surface and the bottom frame surface, and between the first rear mechanical connection assembly and the second rear mechanical connection assembly.

In some embodiments, the vehicle chassis platform includes two or more suspension units each coupled to one of the first and second longitudinal lateral frame surfaces so as none of components of the respective suspension unit is positioned in an area beneath the bottom frame surface and in an area above the upper frame surface.

In some embodiments, the vehicle chassis platform includes two or more drivetrain units each coupled to one of the first and second longitudinal lateral frame surfaces so as none of components of the respective drivetrain unit is positioned in an area beneath the bottom frame surface and in an area above the upper frame surface.

In some embodiments, the vehicle chassis platform includes two or more steering units each coupled to one of the first and second longitudinal lateral frame surfaces so as none of components of the respective steering unit is positioned in an area beneath the bottom frame surface and in an area above the upper frame surface.

Some embodiments of the present invention may provide a vehicle including: a frame having a front frame end, a rear frame end, a longitudinal frame axis, an upper frame surface, a bottom frame surface, a first longitudinal lateral frame surface and a second longitudinal lateral frame surface, wherein the upper frame surface is substantially flat; and two or more mechanical connection assemblies each coupled to one of the first and second longitudinal lateral surfaces, each of mechanical connection assemblies to couple a vehicle corner module (VCM) to the frame and to transfer mechanical loads between the frame and the VCM when the VCM is coupled to the frame.

In some embodiments, the upper frame surface includes at least one non-flat upper frame surface portion and a flat upper frame surface portion, and wherein an area of the flat upper frame surface portion is between 80% and 95% of a total area of the upper frame surface.

In some embodiments, the upper frame surface includes two non-flat upper frame surface portions disposed adjacent to opposite longitudinal lateral frame surfaces with respect to each other and along a transverse frame axis that is perpendicular to the longitudinal frame axis, and a width of the flat upper frame surface in an intermediate region between the two non-flat upper frame surface portions is between 40% and 90% of a maximal width of the upper frame surface.

In some embodiments, the flat upper frame surface portion extends between at least one of: the front frame end and the rear frame end; and the first longitudinal lateral frame surface and the second longitudinal lateral frame surface.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings:

FIGS. 1A, 1B, 1C and 1D are schematic illustrations of a vehicle chassis platform, according to some embodiments of the invention;

Figure 1E:
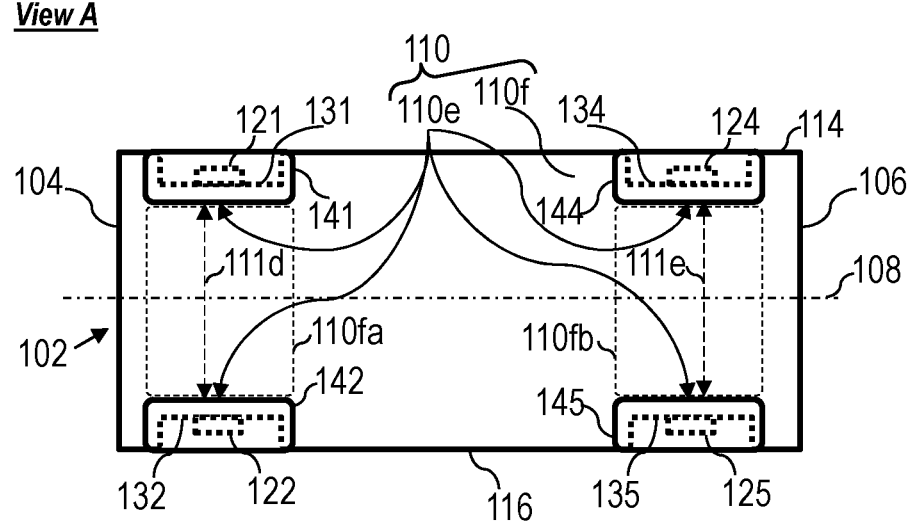
FIGS. 1E and 1F are schematic illustrations of a vehicle chassis platform including non-flat portions on an upper frame surface, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Reference is now made to FIGS. 1A, 1B, 1C and 1D, which are schematic illustrations of a vehicle chassis platform 100, according to some embodiments of the invention.

FIGS. 1A, 1B, 1C and 1D show schematic views A, B, C and D of vehicle chassis platform 100, respectively, as defined in FIGS. 1A and 1B.

Vehicle chassis platform 100 may include a frame 102. Frame 102 may have a front frame end 104, a rear frame end 106, a longitudinal frame axis 108, an upper frame surface 110, a bottom frame surface 112, a first longitudinal lateral frame surface 114 and a second longitudinal lateral frame surface 116.

Upper frame surface 110 may be flat, or substantially flat. In some embodiments, bottom frame surface 112 is flat. In some embodiments, upper frame surface 110 and bottom frame surface 112 are parallel (or substantially parallel) with each other.

Upper frame surface 110 may be, for example, a surface on which a vehicle cabin may be installed and bottom frame surface 112 may be a surface that is opposite (or substantially opposite) to upper frame surface 110. In some embodiments, frame 102 includes structural profiles that form the frame. In some embodiments, frame 102 has one or more gaps surrounded by the structural profiles. In some embodiments, frame 102 includes one or more upper plates coupled to a first side of the structural profiles to provide upper frame surface 110. In some embodiments, upper frame surface 110 is an imaginary surface covering the first side of the structural profiles. In some embodiments, frame 102 includes one or more bottom plates coupled to a second side of the structural profiles (e.g., that is opposite to the first side thereof) to provide bottom frame surface 112. In some embodiments, bottom frame surface 112 is an imaginary surface covering the second side of the structural profiles.

In some embodiments, a width 111a of upper frame surface 110 (e.g., a distance between first and second longitudinal lateral frame surfaces 114, 116) is between 60% and 100% of a length 109 of upper frame surface 110 (e.g., a distance between front and rear frame ends 104, 106). For example, if width 111a of upper frame surface 110 varies along longitudinal frame axis 108, the maximal and/or the minimal width of upper frame surface 110 may be between 60% and 100% of a length 109 of upper frame surface 110.

Vehicle chassis platform 100 may include two or more mechanical connection assemblies. Each of the mechanical connection assemblies may be coupled to one of the longitudinal lateral frame surfaces. Each of the mechanical connection assemblies may couple a vehicle corner module (VCM) to frame 102. A VCM may couple a vehicle wheel to frame 102. In some embodiments, VCM may provide the vehicle wheel with one or more of drivetrain capabilities, braking capabilities, steering capabilities and suspension capabilities. Each of the mechanical connection assemblies may transfer mechanical loads between frame 102 and a VCM when the VCM is coupled to frame 102.

In some embodiments, each of the mechanical connection assemblies detachably couples a VCM to frame 102. In some embodiments, each of the mechanical connection assemblies couples a VCM to one of the longitudinal lateral frame surfaces so as none of components of the VCM is positioned beneath bottom frame surface 112 and/or above upper frame surface 110.

In some embodiments, vehicle platform 100 includes a first front mechanical connection assembly 121 and a second front mechanical connection assembly 122 (e.g., as shown in FIGS. 1A, 1C and 1D). First front mechanical connection assembly 121 and second front mechanical connection assembly 122 may be coupled to opposite longitudinal lateral frame surfaces with respect to each other. For example, first front mechanical connection assembly 121 may be coupled to first longitudinal lateral frame surface 114 and second front mechanical connection assembly 122 may be coupled to second longitudinal lateral frame surface 116 (e e.g., as shown in FIGS. 1A, 1C and 1D). First front mechanical connection assembly 121 and second front mechanical connection assembly 122 may be positioned along a front transverse frame axis 123 that is perpendicular to longitudinal frame axis 108.

In some embodiments, vehicle platform 100 includes a first rear mechanical connection assembly 124 and a second rear mechanical connection assembly 125 (e.g., as shown in Figs. FIGS. 1A, 1C and 1D). First rear mechanical connection assembly 124 and second rear mechanical connection assembly 125 may be coupled to opposite longitudinal lateral frame surfaces with respect to each other. For example, first rear mechanical connection assembly 124 may be coupled to first longitudinal lateral frame surface 114 and second rear mechanical connection assembly 125 may be coupled to second longitudinal lateral frame surface 116 (e.g., as shown in Figs. FIGS. 1A, 1C and 1D). First rear mechanical connection assembly 124 and second rear mechanical connection assembly 125 may be positioned along a rear transverse frame axis 126 that is perpendicular to longitudinal frame axis 108.

In some embodiments, frame 102 includes two or more VCM concave indents. The VCM concave indents may be part of the longitudinal lateral frame surfaces. In some embodiments, each of the mechanical connection assemblies may be positioned within one of the VCM concave indents. Each of the VCM concave indent may accommodate a VCM when the VCM is coupled to frame 102 and/or at least a portion of a vehicle wheel when the vehicle wheel is coupled to the VCM.

In some embodiments, frame 102 includes a first front VCM concave indent 131 being part of first longitudinal lateral frame surface 114 and a second front VCM concave indent 132 being part of second longitudinal lateral frame surface 116 (e.g., as shown in Figs. FIGS. 1A, 1C and 1D). First front mechanical connection assembly 121 may be positioned within first front VCM concave indent 131. Second front mechanical connection assembly 122 may be positioned within second front VCM concave indent 132. First and second front VCM concave indents 131, 132 may be positioned along front transverse frame axis 123.

In some embodiments, frame 102 includes a first rear VCM concave indent 134 being part of first longitudinal lateral frame surface 114 and a second rear VCM concave indent 135 being part of second longitudinal lateral frame surface 116 (e.g., as shown in Figs. FIGS. 1A, 1C and 1D). First rear mechanical connection assembly 124 may be positioned within first rear VCM concave indent 134. Second rear mechanical connection assembly 125 may be positioned within second rear VCM concave indent 135. First and second rear VCM concave indents 134, 135 may be positioned along rear transverse frame axis 126.

In various embodiments, a width 111b of upper frame surface 110 in a front intermediate transverse region 110a between first and second front VCM concave indents 131, 132 and/or a width 111c of upper frame surface 110 in a rear intermediate transverse region 110b between first and second rear VCM concave indents 134, 135 is between 40% and 90% of width 111a of upper frame surface 110. For example, if width 111b of upper frame surface 110 in front intermediate region 110a varies along longitudinal frame axis 108, the maximal and/or the minimal width of upper frame surface 110 in front intermediate region 110a may be between 40% and 90% of the width (e.g., the maximal and/or the minimal width) of upper frame surface 110. In another example, if width 111c of upper frame surface 110 in rear intermediate region 110b varies along longitudinal frame axis 108, the maximal and/or the minimal width of upper frame surface 110 in rear intermediate region 110b may be between 40% and 90% of the width (e.g., the maximal and/or the minimal width) of upper frame surface 110 (e.g., between 50%-80%, 60%-70%, etc.).

In some embodiments, upper frame surface 110 in front intermediate transverse region 110a is flat (or substantially flat). In some embodiments, upper frame surface 110 in rear intermediate transverse region 110b between first and second rear VCM concave indents 134, 135 is flat (or substantially flat). In some embodiments, upper frame surface 110 in a first intermediate longitudinal transverse region 110c between first front VCM concave indent 131 and first rear VCM concave indent 134 is flat (or substantially flat). In some embodiments, upper frame surface 110 in a second intermediate longitudinal transverse region 110d between second front VCM concave indent 132 and second rear VCM concave indent 135 is flat (or substantially flat).

In some embodiments, vehicle chassis platform 100 includes two or more data exchange interfaces. Each of the data exchange interfaces may be coupled to one of the longitudinal lateral frame surfaces. Each of the data exchange interfaces may be coupled adjacent to one of the mechanical connection assemblies so as coupling of a VCM to the respective data exchange interface may be established when the VCM is being coupled to the respective mechanical connection assembly. Each of the data exchange interfaces may transmit data between vehicle chassis platform 100 and a VCM when the VCM is coupled to frame 102.

In some embodiments, vehicle chassis platform 100 includes a first front data exchange interface 127a coupled to first longitudinal lateral frame surface 114 and a second front exchange data interface 127b coupled to first longitudinal lateral frame surface 116. In some embodiments, vehicle chassis platform 100 includes a first rear data exchange interface 127c coupled to first longitudinal lateral frame surface 114 and a second rear data exchange interface 127d coupled to first longitudinal lateral frame surface 116.

In some embodiments, vehicle chassis platform 100 includes two or more power interfaces. Each of the power interfaces may be coupled to one of the longitudinal lateral frame surfaces. Each of the power interfaces may be coupled adjacent to one of the mechanical connection assemblies so as coupling of a VCM to the respective power interface may be established when the VCM is being coupled to the respective mechanical connection assembly. Each of the power interfaces may transmit power from vehicle chassis platform 100 to a VCM when the VCM is coupled to the frame 102.

In some embodiments, vehicle chassis platform 100 includes a first front power interface 128a coupled to first longitudinal lateral frame surface 114 and a second front power interface 128b coupled to first longitudinal lateral frame surface 116. In some embodiments, vehicle chassis platform 100 includes a first rear power interface 128c coupled to first longitudinal lateral frame surface 114 and a second rear power interface 128d coupled to first longitudinal lateral frame surface 116.

Figure 1F:
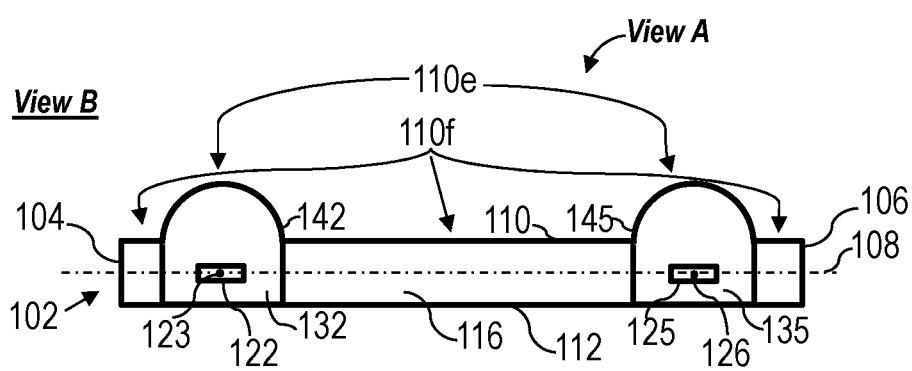

Reference is now made to FIGS. 1E and 1F, which are schematic illustrations of a vehicle chassis platform 100 including non-flat portions on an upper frame surface, according to some embodiments of the invention.

FIGS. 1E and 1F show schematic views A and B of vehicle chassis platform 100, respectively, as shown in FIGS. 1A and 1B.

In some embodiments, upper frame surface 110 includes one or more non-flat upper frame surface portions 110e and a flat upper frame surface portion 110f.

For example, non-flat upper frame surface portions 110e may be formed by fenders (e.g., as shown in FIGS. 1E and 1F). In some embodiments, frame 102 includes two or more fenders. Each of the fenders may be positioned on upper frame surface 110 adjacent to one of the VCM concave indents and may protrude from upper frame surface 110. Each of the fenders may frame, together with the respective VCM concave indent, a space adapted to accommodate a VCM when the VCM is coupled to frame 102.

In some embodiments, frame 102 includes a first front fender 141 that is adjacent to first front VCM concave indent 131 and a second front fender 142 that is adjacent to a second front VCM concave indent 132 (e.g., as shown in FIGS. 1E and 1F). In some embodiments, frame 102 includes a first rear fender 144 that is adjacent to first rear VCM concave indent 134 and a second rear fender 145 that is adjacent to second rear VCM concave indent 135 (e.g., as shown in FIGS. 1E and 1F).

In some embodiments, at least a portion of flat upper frame surface portion 110f extends between front frame end 104 and rear frame end 106. In some embodiments, at least a portion of flat upper frame surface portion 110f extends between first longitudinal lateral frame surface 114 and second longitudinal lateral frame surface 116.

In some embodiments, an area of flat upper frame surface portion 110f is between 80% and 95% of a total area of upper frame surface 110. In some embodiments, an area of non-flat upper frame surface portions 110e is between 5% and 40% of a total area of upper frame surface 110.

In some embodiments, a width of flat upper frame surface portion 110f in a region between non-flat upper frame surface portions disposed adjacent to opposite longitudinal lateral frame surfaces with respect to each other is between 40% and 80% of the width of upper frame surface 110. For example, a width 111d (e.g., maximal and/or minimal width) of upper frame surface portion 110f in an intermediate transverse region 110fa between first and second front fenders 141, 142 may be between 40% and 80% of the width (e.g., maximal and/or minimal width) of upper frame surface 110. In another example, a width 111e (e.g., maximal and/or minimal width) of upper frame surface portion 110f in an intermediate transverse region 110fb between first and second rear fenders 144, 145 may be between 40% and 80% of the width (e.g., maximal and/or minimal width) of upper frame surface 110 (e.g., between 70%-80%, 10%-30%, etc.).

Reference is now made to FIGS. 1G, 1H, 1I, 1J, 1K and 1L, which are schematic illustrations of a vehicle chassis platform 100 including one or more electrical-vehicle batteries (EVB) compartments, according to some embodiments of the invention.

In some embodiments, frame 102 includes one or more electrical-vehicle batteries (EVB) compartments. The EVB compartment(s) may be positioned within frame 102 between upper frame surface 110 and bottom frame surface 112.

Figure 1G:
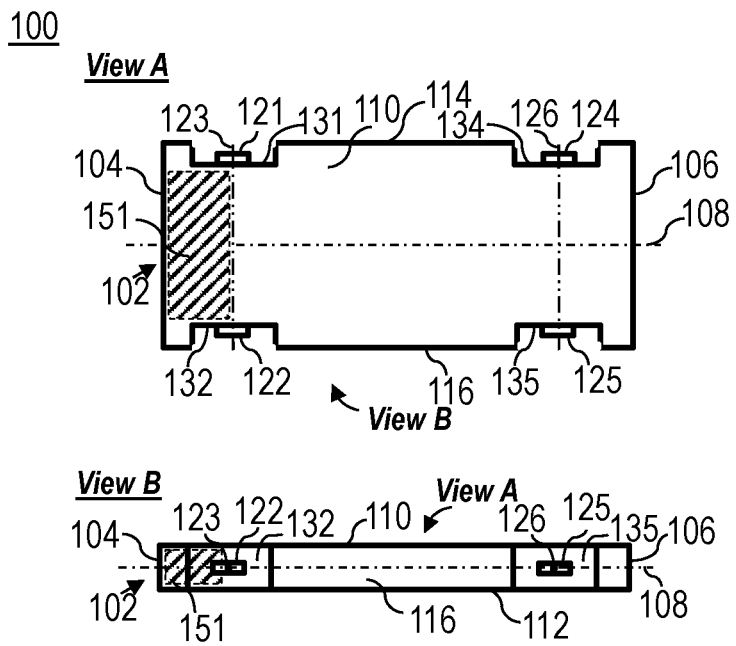
FIGS. 1G, 1H, 1I, 1J, 1K and 1L are schematic illustrations of a vehicle chassis platform including one or more electrical-vehicle batteries (EVB) compartments, according to some embodiments of the invention.
Figure 1H:
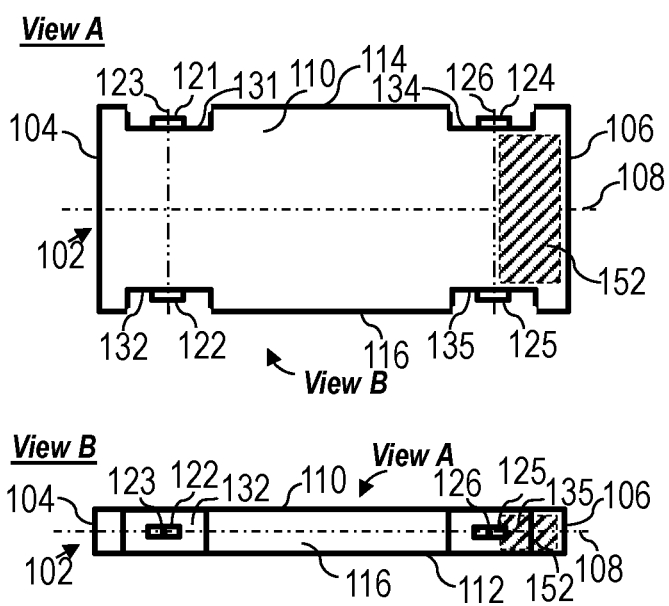

In some embodiments, frame 102 includes one or more first EVB compartments 151 positioned between front frame end 104 and front transverse frame axis 123 (e.g., as shown in FIG. 1G). In some embodiments, vehicle chassis platform 100 includes one or more second EVB compartments 152 positioned between rear frame end 106 and rear transverse frame axis 126 (e.g., as shown in FIG. 1H).

Figure 1I:
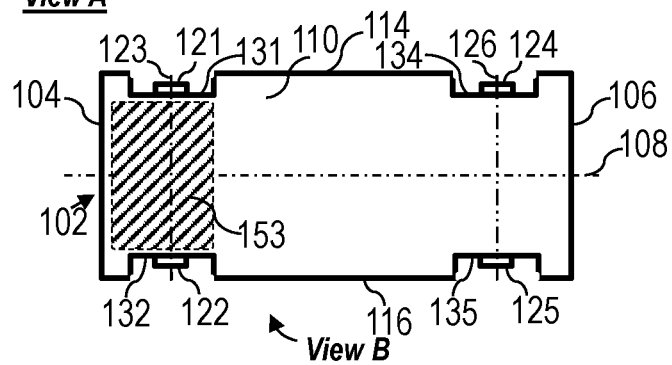
Figure 1I:
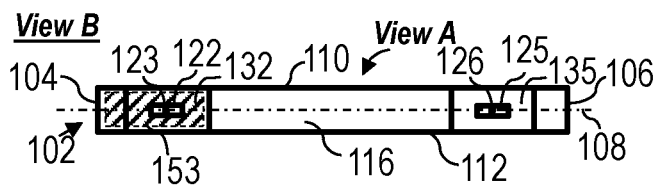

In some embodiments, frame 102 includes one or more third EVB compartments 153 positioned between first and second front mechanical connection assemblies 121, 122 (e.g., as shown in FIG. 1I). For example, third EVB compartment(s) 153 may be adjacent to front frame end 104 and extend beyond front transverse frame axis 123 along longitudinal frame axis 108 (e.g., as shown in FIG. 1I). In another example, third EVB compartment(s) 153 may be positioned between first and second front VCM concave indents 131, 132.

Figure 1J:
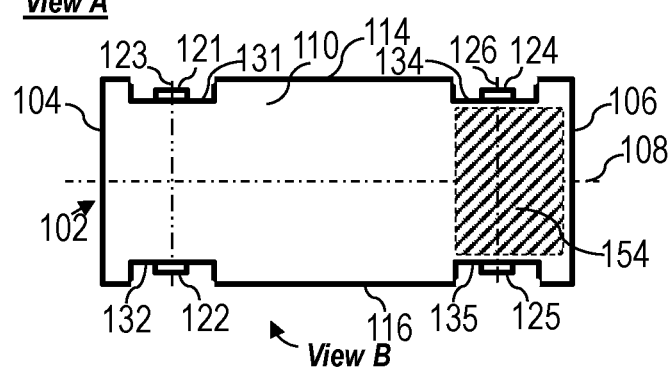
Figure 1J:
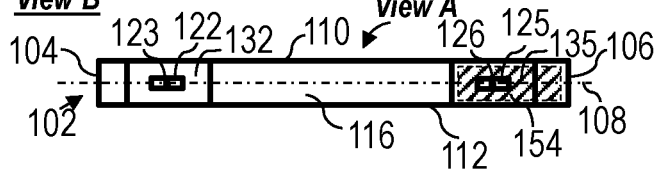

In some embodiments, frame 102 includes one or more fourth EVB compartments 154 positioned between first and second rear mechanical connection assemblies 124, 125 (e.g., as shown in FIG. 1J). For example, fourth EVB compartment(s) 154 may be adjacent to rear frame end 106 and extend beyond rear transverse frame axis 126 along longitudinal frame axis 108 (e.g., as shown in FIG. 1J). In another example, fourth EVB compartment(s) 154 may be positioned between first and second rear VCM concave indents 134, 135.

Figure 1K:
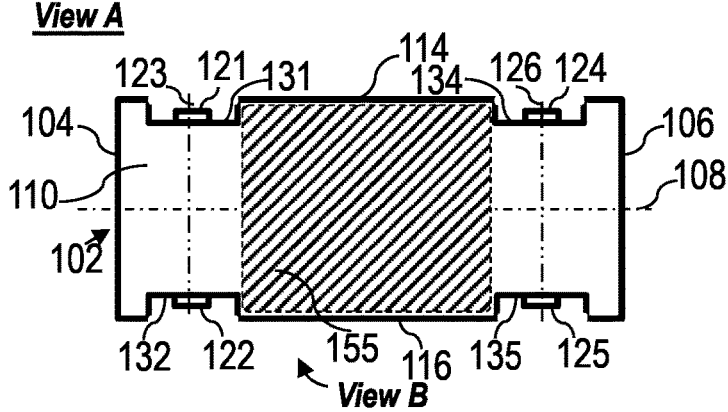
Figure 1K:
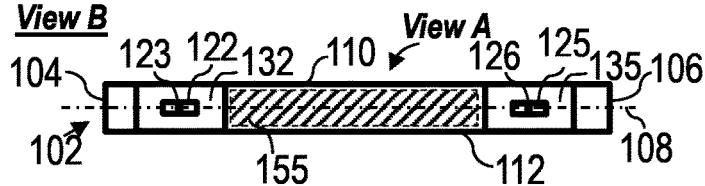

In some embodiments, frame 102 includes one or more fifth EVB compartments 155 positioned in a region between first and second transverse frame axes 123, 126 (e.g., as shown in FIG. 1K). For example, fifth compartment(s) 155 may be positioned in a region between front VCM concave indents 131, 132 and rear VCM concave indents 134, 135 (e.g., as shown in FIG. 1K).

Figure 1L:
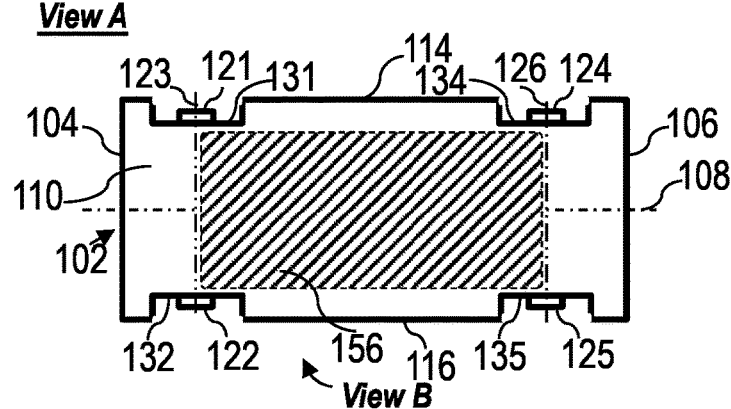
Figure 1L:
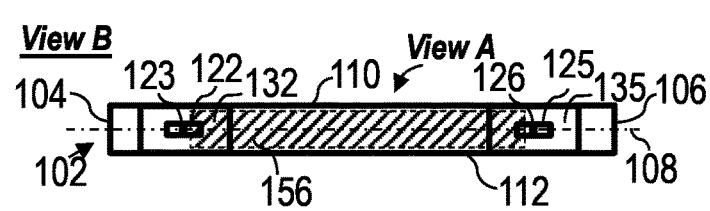

In some embodiments, frame 102 includes one or more sixth EVB compartments 156 extending between front transverse frame axis 123 and rear transverse frame axis 126 (e.g., as shown in FIG. 1L).

It is noted that other embodiments of EVM components are also possible. For example, frame 102 may include one or more EVB compartments extending from front frame end 104 to rear frame end 106. In another example, frame 102 may include one or more EVB compartments extending from front frame end 104 to rear transverse axis 126. In another example, frame 102 may include one or more EVB compartments extending from front transverse axis 123 to rear frame end 106.

In some embodiments, frame 102 includes any combination of the EVB compartments as shown and/or described.

Figure 2A:
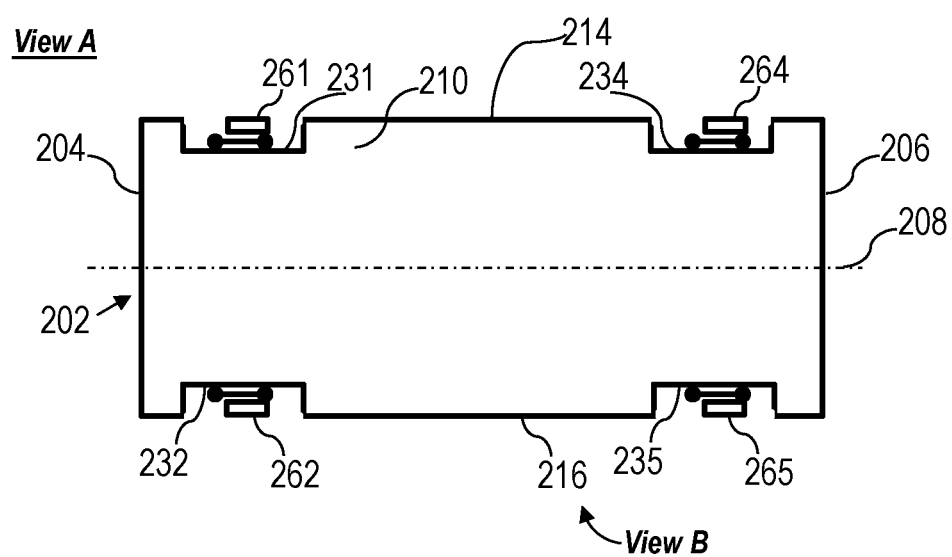
FIGS. 2A and 2B are schematic illustrations of a vehicle chassis platform including two or more suspension units, according to some embodiments of the invention.
Figure 2B:
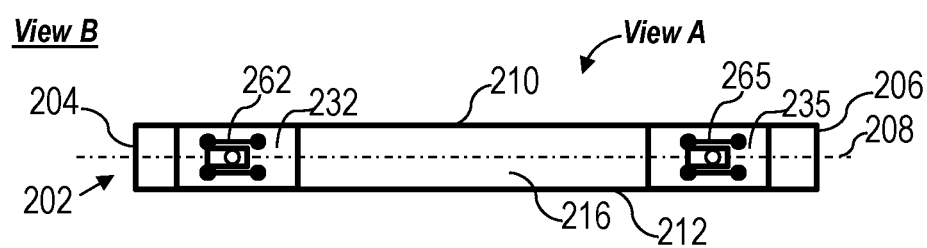

Reference is now made to FIGS. 2A and 2B, which are schematic illustrations of a vehicle chassis platform 200 including two or more suspension units, according to some embodiments of the invention.

Vehicle chassis platform 200 may include a frame 202. Frame 202 may be similar to frame 102 described hereinabove. Frame 202 may have a front frame end 204, a rear frame end 206, a longitudinal frame axis 208, an upper frame surface 210, a bottom frame surface 212, a first longitudinal lateral frame surface 214 and a second longitudinal lateral frame surface 216. Upper frame surface 210 may be flat, or substantially flat. In some embodiments, bottom frame surface 212 is flat. In some embodiments, upper frame surface 210 and bottom frame surface 212 are parallel (or substantially parallel) to each other.

In some embodiments, vehicle chassis platform 200 may include two or more suspension units. Each of the suspension units may be coupled to one of the longitudinal lateral frame surfaces. In some embodiments, each of the suspension units may be coupled to one of the longitudinal lateral frame surfaces so as none of components of the suspension unit is positioned in an area beneath bottom frame surface 212 and in an area above upper frame surface 210.

In some embodiments, vehicle chassis platform 200 includes a first front suspension unit 261 coupled to first longitudinal lateral frame surface 214 and a second front suspension unit 262 coupled to first longitudinal lateral frame surface 216. In some embodiments, vehicle chassis platform 200 includes a first rear suspension unit 264 coupled to first longitudinal lateral frame surface 214 and a second rear suspension unit 265 coupled to first longitudinal lateral frame surface 216.

In some embodiments, frame 202 includes two or more concave indents being part of the longitudinal lateral frame surfaces. In some embodiments, each of the suspension units may be positioned within one of the concave indents.

In some embodiments, frame 202 includes a first front concave indent 231 being part of first longitudinal lateral frame surface 214 and a second front concave indent 232 being part of second longitudinal lateral frame surface 216. First front suspension unit 261 may be positioned within first front concave indent 231. Second front suspension unit 262 may be positioned within second front concave indent 232.

In some embodiments, frame 202 includes a first rear concave indent 234 being part of first longitudinal lateral frame surface 214 and a second rear concave indent 235 being part of second longitudinal lateral frame surface 216. First rear suspension unit 264 may be positioned within first rear concave indent 234. Second rear suspension unit 265 may be positioned within second rear concave indent 235.

Figure 3A:
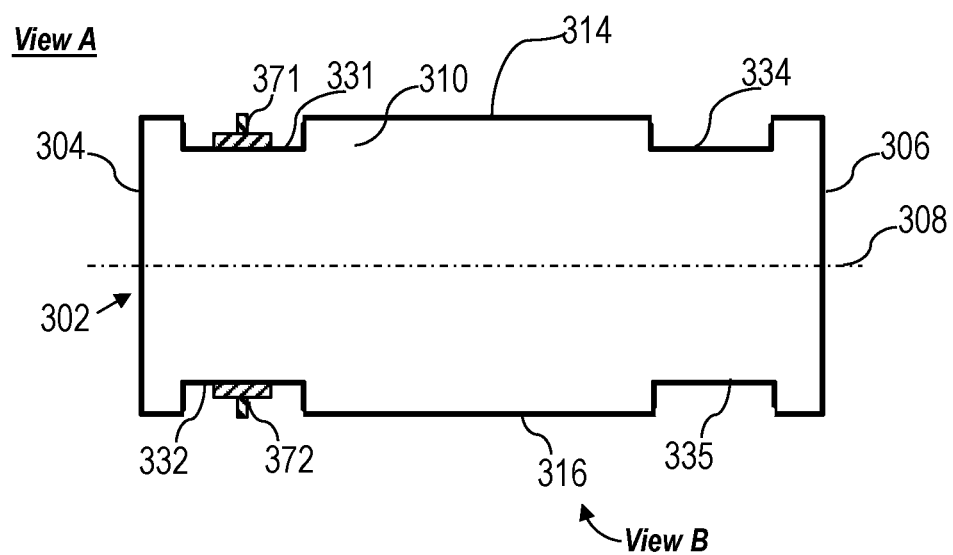
FIGS. 3A and 3B are schematic illustrations of a vehicle chassis platform including two or more drivetrain units, according to some embodiments of the invention.
Figure 3B:
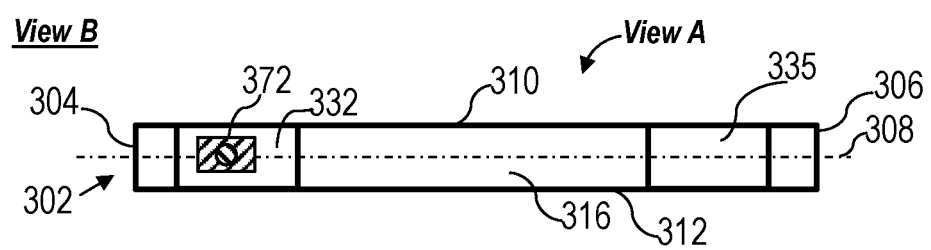

Reference is now made to FIGS. 3A and 3B, which are schematic illustrations of a vehicle chassis platform 300 including two or more drivetrain units, according to some embodiments of the invention.

Vehicle chassis platform 300 may include a frame 302. Frame 302 may be similar to frame 102 described hereinabove. Frame 302 may have a front frame end 304, a rear frame end 306, a longitudinal frame axis 308, an upper frame surface 310, a bottom frame surface 312, a first longitudinal lateral frame surface 314 and a second longitudinal lateral frame surface 316. Upper frame surface 310 may be flat, or substantially flat. In some embodiments, bottom frame surface 312 is flat. In some embodiments, upper frame surface 310 and bottom frame surface 312 are parallel (or substantially parallel) with respect to each other.

In some embodiments, vehicle chassis platform 300 includes two or more drivetrain units. Each of the drivetrain units may be coupled to one of the longitudinal lateral frame surfaces. In some embodiments, each of the drivetrain units may be coupled to one of the longitudinal lateral frame surfaces so as none of components of the drivetrain unit is positioned in an area beneath bottom frame surface 312 and/or in an area above upper frame surface 310.

In some embodiments, vehicle chassis platform 300 includes a first front drivetrain unit 371 coupled to first longitudinal lateral frame surface 314 and a second front drivetrain unit 372 coupled to second longitudinal lateral frame surface 316.

In some embodiments, frame 302 includes two or more concave indents being part of the longitudinal lateral frame surfaces. In some embodiments, each of the drivetrain units may be positioned within one of the concave indents. In some embodiments, frame 302 includes a first front concave indent 331 being part of first longitudinal lateral frame surface 314 and a second front concave indent 332 being part of second longitudinal lateral frame surface 316. First front drivetrain unit 371 may be positioned within first front concave indent 331. Second front suspension unit 372 may be positioned within second front concave indent 332.

In various embodiments, vehicle chassis platform 300 includes a first rear drivetrain unit coupled to first longitudinal lateral frame surface 314 and/or positioned in a first rear concave indent 334 and a second rear drivetrain unit coupled to second longitudinal lateral frame surface 316 and/or positioned in a second rear concave indent 335.

In some embodiments, vehicle chassis platform 300 includes the first and second front drivetrain units only. In some embodiments, vehicle chassis platform 300 includes the first and second rear drivetrain units only. In some embodiments, vehicle chassis platform 300 includes the first and second front drivetrain units and the first and second rear drivetrain units.

In some embodiments, the drivetrain units are not mechanically connected to each other.

Figure 4A:
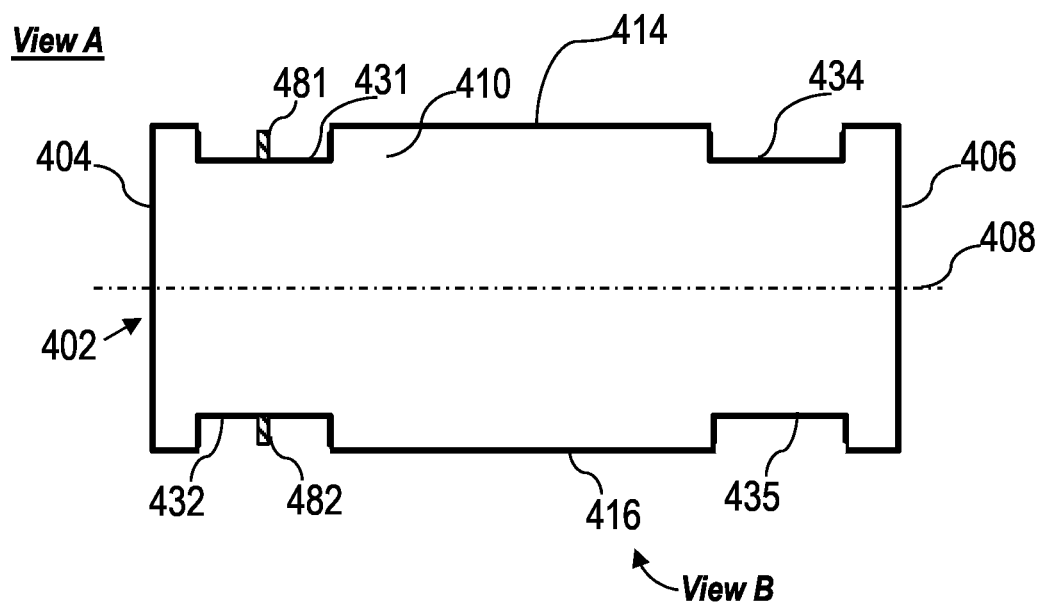
FIGS. 4A and 4B are schematic illustrations of a vehicle chassis platform including two or more steering units, according to some embodiments of the invention.
Figure 4B:
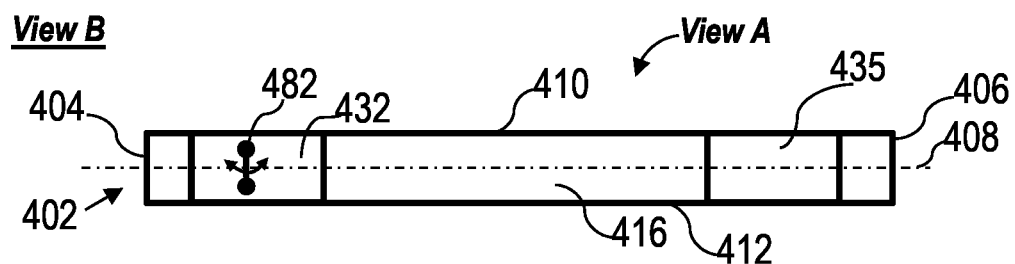

Reference is now made to FIGS. 4A and 4B, which are schematic illustrations of a vehicle chassis platform 400 including two or more steering units, according to some embodiments of the invention.

Vehicle chassis platform 400 may include a frame 402. Frame 402 may be similar to frame 102 described hereinabove. Frame 402 may have a front frame end 404, a rear frame end 406, a longitudinal frame axis 408, an upper frame surface 410, a bottom frame surface 412, a first longitudinal lateral frame surface 414 and a second longitudinal lateral frame surface 416. Upper frame surface 410 may be flat, or substantially flat. In some embodiments, bottom frame surface 412 is flat. In some embodiments, upper frame surface 410 and bottom frame surface 412 are parallel (or substantially parallel) with respect to each other.

In some embodiments, vehicle chassis platform 400 includes two or more steering units. Each of the steering units may be coupled to one of the longitudinal lateral frame surfaces. In some embodiments, each of the steering units may be coupled to one of the longitudinal lateral frame surfaces so as none of components of the steering unit is positioned in an area beneath bottom frame surface 412 and/or in an area above upper frame surface 410.

In some embodiments, vehicle chassis platform 400 includes a first front steering unit 481 coupled to first longitudinal lateral frame surface 414 and a second front steering unit 482 coupled to first longitudinal lateral frame surface 416.

In some embodiments, frame 402 includes two or more concave indents on the longitudinal lateral frame surfaces. In some embodiments, each of the steering units may be positioned within one of the concave indents.

In some embodiments, frame 402 includes a first front concave indent 431 being part of first longitudinal lateral frame surface 414 and a second front concave indent 432 being part of second longitudinal lateral frame surface 416. First front steering unit 481 may be positioned within first front concave indent 431. Second front steering unit 482 may be positioned within second front concave indent 432.

In various embodiments, vehicle chassis platform 400 includes a first rear steering unit coupled to first longitudinal lateral frame surface 414 and/or positioned in a first rear concave indent 434 and a second rear steering unit coupled to second longitudinal lateral frame surface 416 and/or positioned in a second rear concave indent 435.

In some embodiments, vehicle chassis platform 500 includes the first and second front drivetrain units only. In some embodiments, vehicle chassis platform 500 includes the first and second rear drivetrain units only. In some embodiments, vehicle chassis platform 500 includes the first and second front drivetrain units and the first and second rear drivetrain units.

In some embodiments, the steering units are not mechanically connected to each other.

Figure 5A:
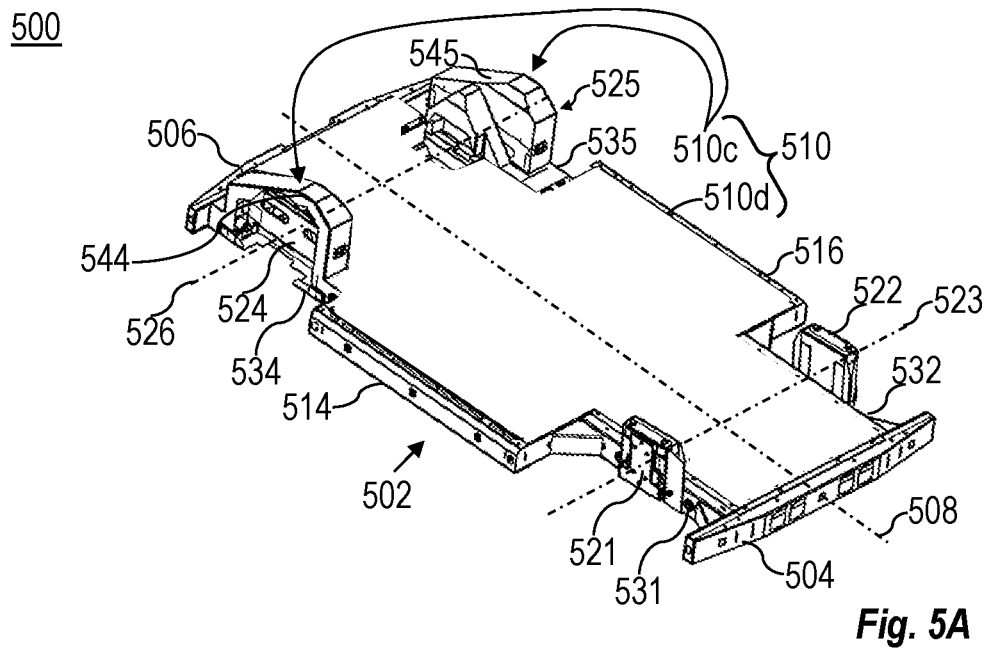
FIGS. 5A, 5B and 5C are schematic illustrations of one embodiment of a vehicle chassis platform, according to some embodiments of the invention.
Figure 5B:
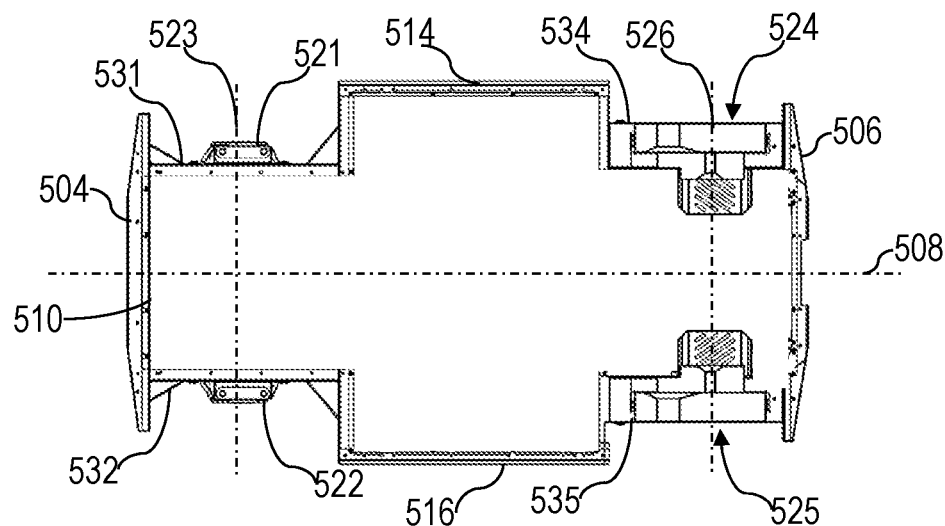
Figure 5C:
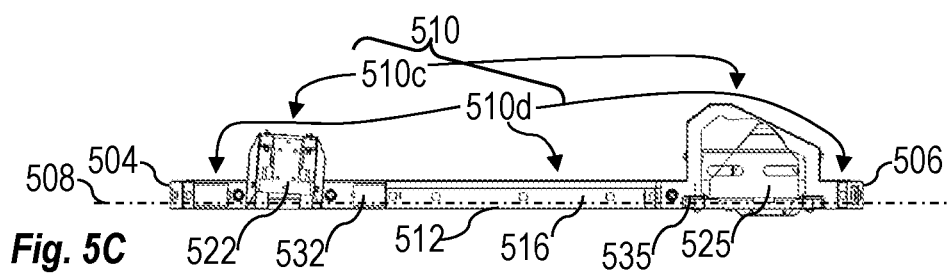
Figure 6A:
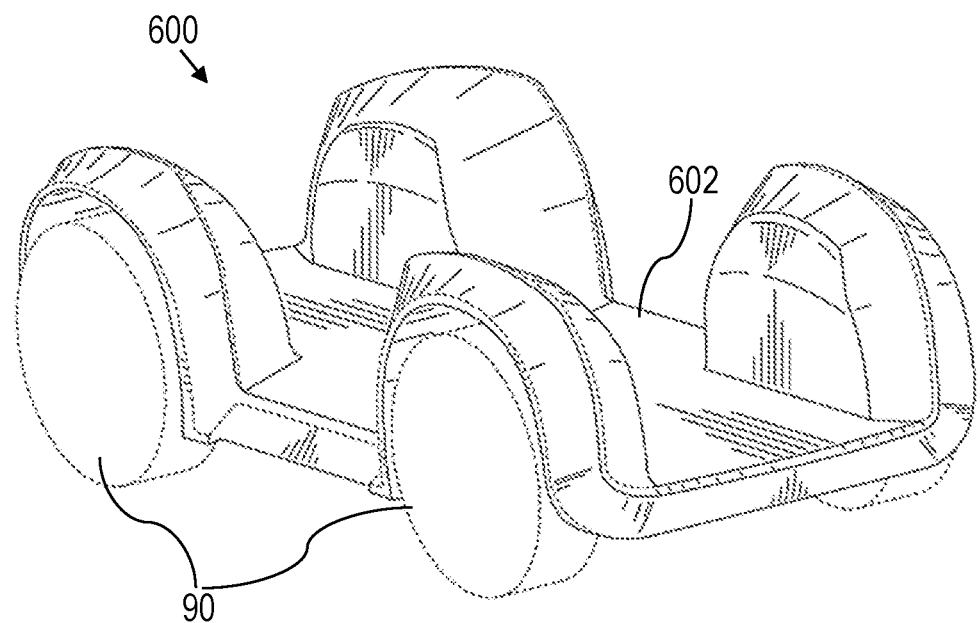
FIGS. 6A, 6B, 6C, 6D, 6E and 6F are schematic illustrations of one embodiment of a vehicle chassis platform and wheels assembled thereto, according to some embodiments of the invention.
Figure 6B:
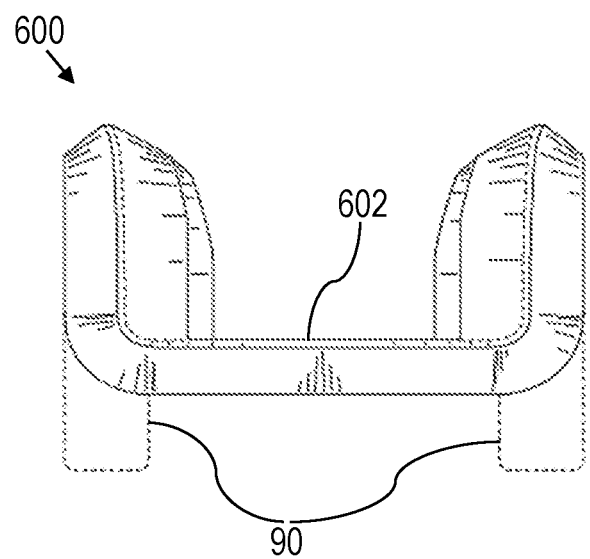
Figure 6C:
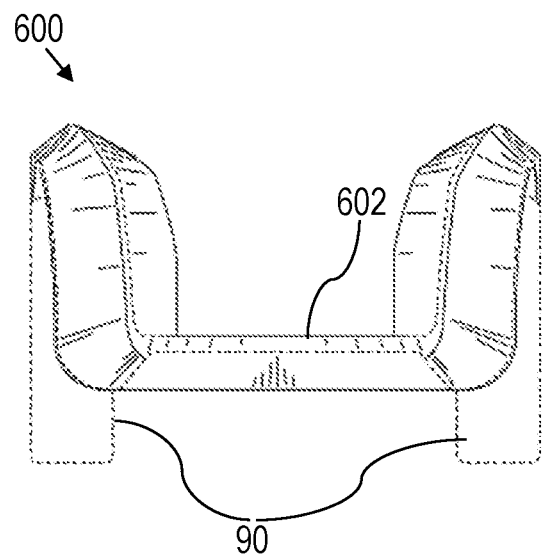
Figure 6D:
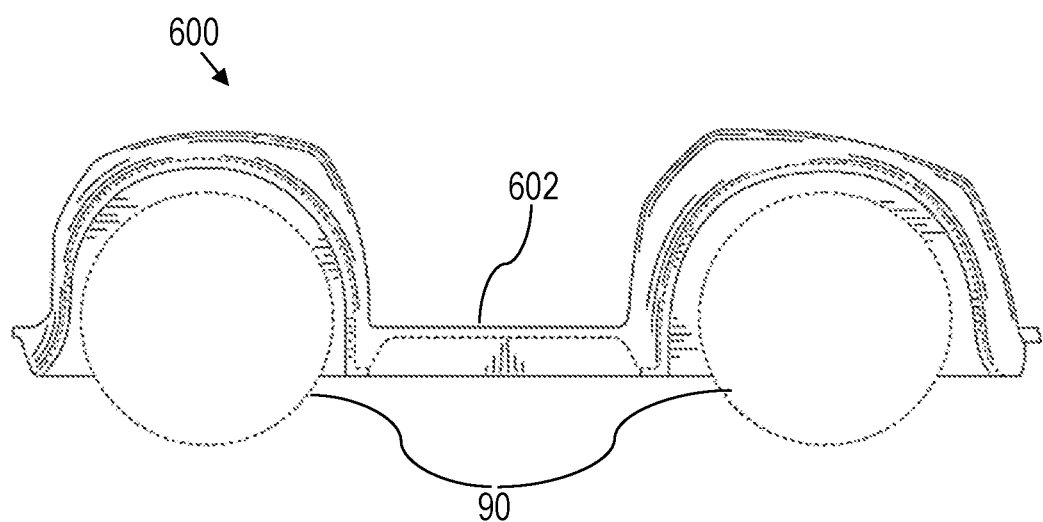
Figure 6E:
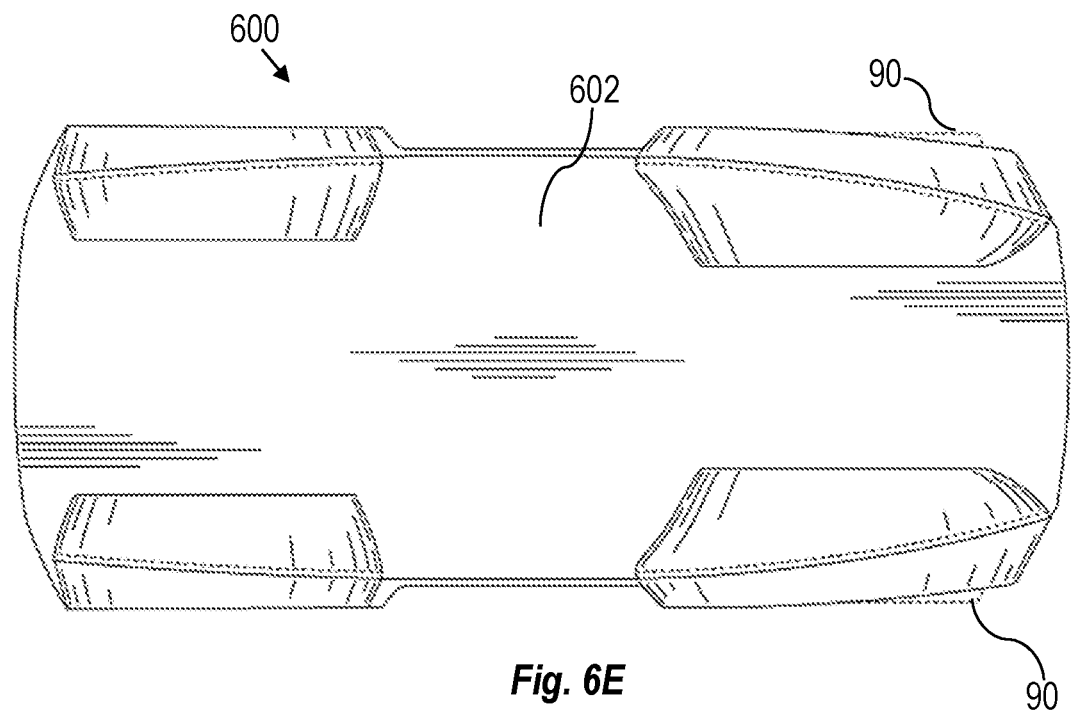
Figure 6F:
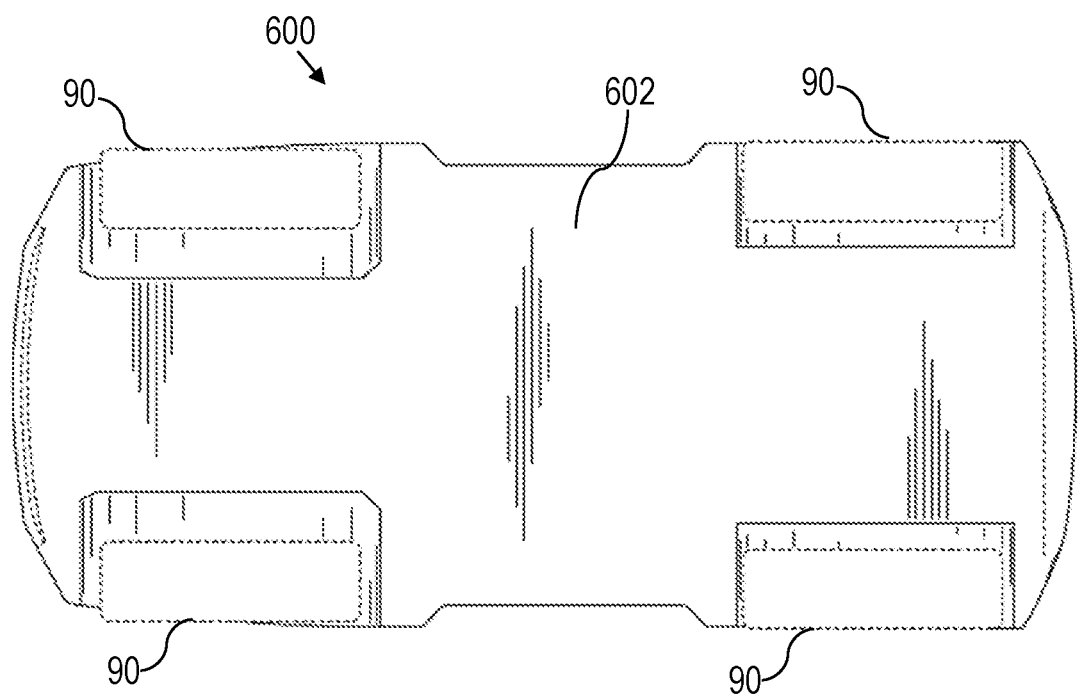

Reference is now made to FIGS. 5A, 5B and 5C, which are schematic illustrations of one exemplary embodiment of a vehicle chassis platform 500, according to some embodiments of the invention.

FIGS. 5A, 5B and 5C show schematic panoramic view, schematic view A and schematic view B of vehicle chassis platform 500, respectively.

Vehicle chassis platform 500 may include a frame 502. Frame 502 may be similar to frame 102 described hereinabove. Frame 502 may have a front frame end 504, a rear frame end 506, a longitudinal frame axis 508, an upper frame surface 510, a bottom frame surface 512, a first longitudinal lateral frame surface 514 and a second longitudinal lateral frame surface 516.

Upper frame surface 510 may be flat, or substantially flat. In some embodiments, bottom frame surface 512 is flat. In some embodiments, upper frame surface 510 and bottom frame surface 112 are parallel (or substantially parallel) with each other.

Vehicle chassis platform 500 may include two or more mechanical connection assemblies. The mechanical connection assemblies may be similar to mechanical connection assemblies described hereinabove with respect to FIGS. 1A-1D. Vehicle platform 500 may include a first front mechanical connection assembly 521 coupled to first longitudinal lateral frame surface 514 and a second front mechanical connection assembly 522 coupled to second longitudinal lateral frame surface 516. First front mechanical connection assembly 521 and second front mechanical connection assembly 522 may be positioned along a front transverse frame axis 523 that is perpendicular to longitudinal frame axis 508.

Vehicle platform 500 may include a first rear mechanical connection assembly 524 coupled to first longitudinal lateral frame surface 514 and a second rear mechanical connection assembly 525 coupled to second longitudinal lateral frame surface 516. First rear mechanical connection assembly 524 and second rear mechanical connection assembly 525 may be positioned along a rear transverse frame axis 526 that is perpendicular to longitudinal frame axis 108.

Frame 502 may include a first front VCM concave indent 531 being part of first longitudinal lateral frame surface 514 and a second front VCM concave indent 532 being part of second longitudinal lateral frame surface 516. First front mechanical connection assembly 521 may be positioned within first front VCM concave indent 531. Second front mechanical connection assembly 522 may be positioned within second front VCM concave indent 532.

Frame 502 may include a first rear VCM concave indent 534 being part of first longitudinal lateral frame surface 514 and a second rear VCM concave indent 535 being part of second longitudinal lateral frame surface 516. First rear mechanical connection assembly 524 may be positioned within first rear VCM concave indent 534. Second rear mechanical connection assembly 525 may be positioned within second rear VCM concave indent 535.

Upper frame surface 510 may include non-flat upper frame surface portions 510c (e.g., formed by a first rear fender 544 that is adjacent to first rear VCM concave indent 534 and a second rear fender 545 that is adjacent to second rear VCM concave indent 535) and a flat upper frame surface portion 510d. At least a portion of flat upper frame surface portion 510d extends between front frame end 504 and rear frame end 506. At least a portion of flat upper frame surface portion 510d extends between first longitudinal lateral frame surface 514 and second longitudinal lateral frame surface 516.

For example, a length of frame 502 (e.g., a distance from front frame end 504 to rear frame end 506) may be between 2.5-6 meters, a width of frame 502 (e.g., a distance between first and second longitudinal lateral frame surfaces 514, 516) may be between 1.4-2 meters, a length of the VCM concave indents (e.g., a dimension of the VCM concave indents along longitudinal frame axis 508) may be between 0.5-0.9 meters and a width of the VCM concave indents (.g., a dimension of the VCM concave indents along front and/or transverse frame axes 523, 526) may be between 0.2-0.6 meters.

In various embodiments, vehicle chassis platform 500 may include data exchange interface and/or power interfaces (e.g., similar to data exchange interface and/or power interfaces described hereinabove with respect to FIGS. 1A-1D).

In some embodiments, vehicle chassis platform 500 includes at least one of a front bumper and a rear bumper. The front bumper may be attachable to front frame end 504 and the rear bumper may be attachable to rear fame end 506. The front bumper and/or the rear bumper may have bumper height values that are greater than a thickness of frame 502 (e.g., the bumper height values may be greater than a distance between upper frame surface 510 and bottom frame surface 512). The front and/or the rear bumpers may, for example, extend above or below the flat upper frame surface 510 and/or bottom frame surface 512.

Reference is now made to FIGS. 6A, 6B, 6C, 6D, 6E and 6F, which are schematic illustrations of an embodiment of a vehicle chassis platform 600 and wheels 90 assembled thereto, according to some embodiments of the invention.

FIGS. 6A, 6B, 6C, 6D, 6E and 6F schematically show different views of vehicle chassis platform 600 including a frame 602 and of wheels 90 assembled to frame 602.

Some embodiments of the present invention may provide a vehicle. The vehicle may include a vehicle chassis platform. The vehicle chassis platform may be any one of vehicle chassis platform 100, vehicle chassis platform 200, vehicle chassis platform 300, vehicle chassis platform 400 and vehicle chassis platform, as described hereinabove.

In some embodiments, the vehicle includes one or more electrical-vehicle batteries (EVB) being accommodated within the vehicle chassis platform. In some embodiments, the EVB are accommodated within one or more EVB compartments within a frame (e.g., as described elsewhere herein).

The vehicle may be for example, a private vehicle, a passenger car, a commercial vehicle, an autonomous vehicle, a human driven vehicle, a remotely controlled vehicle, a 4-wheeled car, a truck, a bus, a trailer, etc.

The disclosed vehicle chassis platform has a substantially flat upper frame surface and mechanical connection assemblies coupled to longitudinal lateral frame surfaces. Absence of structural components beneath a bottom frame surface and above the upper frame surface and/or substantially flat upper frame surface may save between 50% to 70% of space on the vehicle chassis platform as compared to current vehicle chassis platforms. This space may be used to, for example, increase a size of a vehicle cabin thus increasing the flexibility in designing the vehicle cabin.

The disclosed vehicle chassis platform may, for example, increase a flexibility in selection of electrical-vehicle batteries (EVB) as compared to current vehicle chassis platforms. For example, the frame of the vehicle chassis platform may include EVB compartments that may be positioned at various positions within the frame (e.g., as described hereinabove), thus providing a flexibility in selection of EVB type, EVB size, EVB shape. This in contrast to current vehicle chassis platforms that typically have limited space for accommodating the EVB batteries. Such flexibility may, for example, increase a performance of the vehicle having the disclosed vehicle chassis platform. Such flexibility may, for example, eliminate (or substantially eliminate) geometrical limitations present in current vehicle chassis platforms caused by limited areas in which EVB packs may be placed.

Furthermore, manufacturing of the substantially flat frame of the disclosed vehicle chassis platform may be significantly less complex as compared to current vehicle chassis platforms. For example, the frame of the disclosed vehicle chassis platform may include relatively simple structural profiles and a greater portion of the vehicle platform chassis may include substantially flat components having relatively simple geometry as compared to current vehicle chassis platforms.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A vehicle chassis platform, comprising:
   a frame having a front frame end, a rear frame end, a longitudinal frame axis, an upper frame surface, a bottom frame surface, a first longitudinal lateral frame surface and a second longitudinal lateral frame surface, wherein the upper frame surface is substantially flat; and at least one pair of opposing mechanical connection assemblies each coupled to one of the first and second longitudinal lateral surfaces, each of the mechanical connection assemblies to couple a vehicle corner module (VCM) to the frame such that none of components of at least one of a suspension unit, a drivetrain unit and a steering unit of the VCM is positioned in an area beneath the bottom frame surface and between the opposing mechanical connection assemblies, and in an area above the upper frame surface and between the opposing mechanical connection assemblies.

2. The vehicle chassis platform of claim 1, wherein each of the mechanical connection assemblies to couple the VCM to the frame such that none of components of the suspension unit and the drivetrain unit of the VCM is positioned in an area beneath the bottom frame surface and between the opposing mechanical connection assemblies, and in an area above the upper frame surface and between the opposing mechanical connection assemblies.

3. The vehicle chassis platform of claim 1, wherein each of mechanical connection assemblies to couple the VCM to the frame such that none of components of the suspension unit and the steering unit of the VCM is positioned in an area beneath the bottom frame surface and between the opposing mechanical connection assemblies, and in an area above the upper frame surface and between the opposing mechanical connection assemblies.

4. The vehicle chassis platform of claim 1, wherein each of mechanical connection assemblies to couple the VCM to the frame such that none of components of the drivetrain unit and the steering unit of the VCM is positioned in an area beneath the bottom frame surface and between the opposing mechanical connection assemblies, and in an area above the upper frame surface and between the opposing mechanical connection assemblies.

5. The vehicle chassis platform of claim 1, wherein a minimal width of the upper frame surface is between 60% and 100% of a length of the upper frame surface.

6. The vehicle chassis platform of claim 1, wherein the upper frame surface comprises at least one non-flat upper frame surface portion and a flat upper frame surface portion, and wherein an area of the flat upper frame surface portion is between 80% and 95% of a total area of the upper frame surface.

7. The vehicle chassis platform of claim 6, wherein:
the upper frame surface comprises two non-flat upper frame surface portions disposed adjacent to opposite longitudinal lateral frame surfaces with respect to each other and along a transverse frame axis that is perpendicular to the longitudinal frame axis, and
a width of the flat upper frame surface in an intermediate region between the two non-flat upper frame surface portions is between 40% and 90% of a maximal width of the upper frame surface.

8. The vehicle chassis platform of claim 1, wherein the flat upper frame surface portion extends between at least one of: the front frame end and the rear frame end; and the first longitudinal lateral frame surface and the second longitudinal lateral frame surface.

9. The vehicle chassis platform of claim 1, comprising at least one of:
a pair of front mechanical connection assemblies comprising:
a first front mechanical connection assembly coupled to the first longitudinal lateral frame surface, and a second front mechanical connection assembly coupled to the second longitudinal lateral frame surface,
the first and second front mechanical connection assemblies are positioned along a front transverse frame axis that is perpendicular to the longitudinal frame axis; and
a pair of rear mechanical connection assemblies comprising:
a first rear mechanical connection assembly coupled to the first longitudinal lateral frame surface, and a second rear mechanical connection assembly coupled to the second longitudinal lateral frame surface,
the first and second rear mechanical connection assemblies are positioned along a rear transverse frame axis that is perpendicular to the longitudinal frame axis.

10. The vehicle chassis platform of claim 9, wherein a minimal width of the upper frame surface in a region between at least one of: the first and second front mechanical connection assemblies, and the first and second rear mechanical connection assemblies, is between 40% and 90% of a maximal width of the upper frame surface.

11. The vehicle chassis platform of claim 9, wherein the frame comprises one or more electrical-vehicle batteries compartments positioned between: the upper frame surface and the bottom frame surface, and between the front frame end and the front transverse frame axis.

12. The vehicle chassis platform of claim 9, wherein the frame comprises one or more electrical-vehicle batteries compartments positioned between: the upper frame surface and the bottom frame surface, and between the rear frame end and the rear transverse frame axis.

13. The vehicle chassis platform of claim 9, wherein the frame comprises one or more electrical-vehicle batteries compartments positioned between: the upper frame surface and the bottom frame surface, and between the first front mechanical connection assembly and the second front mechanical connection assembly.

14. The vehicle chassis platform of claim 9, wherein the frame comprises one or more electrical-vehicle batteries compartments positioned between: the upper frame surface and the bottom frame surface, and between the first rear mechanical connection assembly and the second rear mechanical connection assembly.

15. The vehicle chassis platform of claim 9, wherein the frame comprises at least one of:
a pair of front VCM concave indents comprising:
a first front VCM concave indent being part of the first longitudinal lateral frame surface, the first front VCM concave indent comprises the first front mechanical connection assembly, and
a second front VCM concave indent being part of the second longitudinal lateral frame surface, the second front VCM concave indent comprises the second front mechanical connection assembly; and
a pair of rear VCM concave indents comprising:
a first rear VCM concave indent being part of the first longitudinal lateral frame surface, the first rear VCM concave indent comprises the first rear mechanical connection assembly, and
a second rear VCM concave indent being part of the second longitudinal lateral frame surface, the second rear VCM concave indent comprises the second front mechanical connection assembly.

16. The vehicle chassis platform of claim 15, wherein a minimal width of the upper frame surface in a region between at least one of: the first and second front VCM concave indents, and the first and second rear VCM concave indents, is between 40% and 90% of a maximal width of the upper frame surface.

17. The vehicle chassis platform of claim 1, wherein the bottom frame surface is substantially flat and substantially parallel to the upper frame surface.

18. A vehicle comprising the vehicle chassis platform of claim 1.

* * * * *